Oct. 20, 1936.  H. T. FAUS ET AL  2,058,302
TRANSFORMER
Filed Feb. 18, 1936
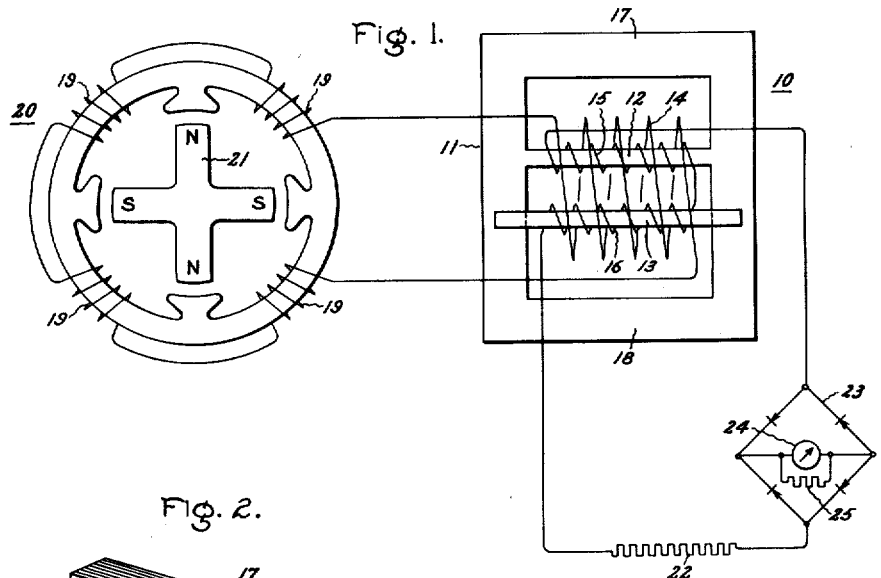
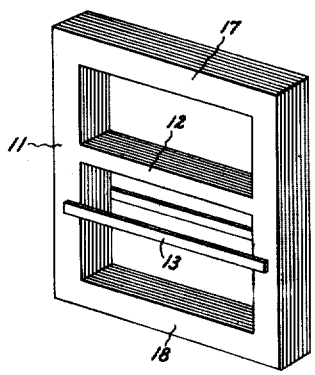
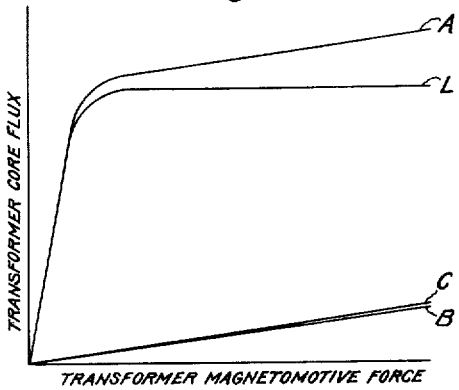
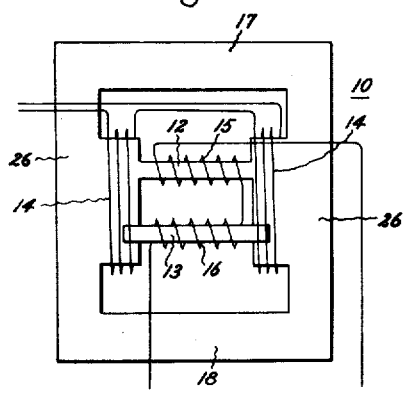
Inventors:
Harold T. Faus,
Almon J. Corson,
by Harry E. Dunham
Their Attorney.

Patented Oct. 20, 1936

2,058,302

UNITED STATES PATENT OFFICE 2,058,302

TRANSFORMER

Harold T. Faus and Almon J. Corson, Lynn, Mass., assignors to General Electric Company, a corporation of New York Application February 18, 1936, Serial No. 64,494

2 Claims. (Cl. 171—119)

Our invention relates to transformers. The voltage of a generator is not always constant for any given speed of the generator because the magnetic characteristics of the generator may change with age and the voltage of the generator may be affected by changes in the temperature of the windings. An indicating instrument responsive to changes in the generator voltage cannot be relied upon to indicate its speed accurately. The frequency of the generator, however, is always exactly proportional to its speed and in order that the instrument may give accurate indications of the speed it has been proposed to interpose between the generator and the instrument a transformer having such characteristics that its secondary voltage is independent of changes in its primary voltage and therefore of changes in the generator voltage, but is substantially proportional to the generator frequency so that the instrument may indicate with substantial accuracy the frequency and therefore the speed of the generator. Such a transformer is disclosed in the United States Patent No. 1,835,969 to A. J. Rohner, issued December 8, 1931, and assigned to the General Electric Company.

The general object of the present invention is to provide an improved transformer having such characteristics that throughout its operating range its secondary voltage will be independent of changes in its primary voltage, but will be very exactly proportional to the frequency of its primary voltage.

The invention will be better understood from the following description taken in connection with the accompanying drawing in which Fig. 1 shows a transformer constructed in accordance with the invention and connected between a generator and an instrument for indicating the generator frequency and speed; Fig. 2 is a perspective view of the magnetic core of the transformer; Fig. 3 is an explanatory diagram; and Fig. 4 shows a modified form of the invention.

Like reference characters indicate similar parts in the different figures of the drawing.

The transformer 10 shown in Fig. 1 has a magnetic core 11 having two inner winding legs 12 and 13, a primary winding 14 surrounding both winding legs and two secondary windings 15 and 16 surrounding the winding legs 12 and 13 respectively. The transformer is of the shell type with outside legs 17 and 18 providing return paths for the magnetic flux in the winding legs 12 and 13 and surrounding these winding legs and the primary and secondary windings 14, 15 and 16.

The secondary windings 15 and 16 are connected in series with their voltages opposed. The primary winding 14 is connected to the windings 19 of the generator 20. The alternating voltage is induced in the generator windings 19 by rotation of the rotor 21. The secondary windings 15 and 16 of the transformer are connected through a high resistance 22 and a full wave rectifier 23 to an indicating instrument 24. The rectifier 23 permits the use of a direct current indicating instrument which is preferable to one of the alternating current type because of its more uniform scale division. The resistances of the secondary windings 15 and 16 of the transformer and of the indicating instrument 24 tend to vary directly with changes in their temperatures and the resistance of the rectifier 23 will probably change inversely with temperature changes. The change in resistance of the rectifier 23 is usually greater than the combined change in resistance of the secondary windings 15 and 16 and of the indicating instrument 24. The resistance 22 may have a slight negative temperature coefficient to compensate for the resistance changes in the windings 15 and 16 and in the rectifier 23 and instrument 24, and its resistance should be very high so that the resistance of the entire circuit will be high compared to its reactance. A resistance 25 having a slight negative temperature coefficient may be connected across the instrument 24 to compensate for errors due to changes in the temperature of the instrument.

The alternating voltage of the generator windings 19 forces alternating current through the primary winding 14 of the transformer 10 and this produces an alternating magnetomotive force in the transformer core. This magnetomotive force will of course increase and decrease with the speed of the generator. The resultant voltage of the secondary windings 15 and 16 is equal to the difference between the two voltages because they are connected with their voltages opposed. It will be assumed that the number of turns is the same in both windings 15 and 16.

Fig. 3 shows the relation between the transformer magnetomotive force and the transformer core flux. The winding leg 12 is preferably formed of magnetic material having very high permeability such as any one of the well known nickel-iron alloys. The winding leg 13 is formed of two small strips of material of very small cross section held against opposite faces of the ends of the core by the secondary winding 16 surrounding them. The winding 16 is also held in place by the two strips forming its winding leg.

The magnetomotive force produced by the primary winding 14 induces a magnetic force in the winding leg 12, this flux following a return path through the outer legs 17 and 18 of the core. This magnetic flux in the winding leg 12 may be represented by the curve A of Fig. 3. The primary winding 14 produces a magnetomotive force which would induce a magnetic flux represented by the curve B of Fig. 3 if the reluctance of its winding leg 13 were the same as that of air. At least one of the strips forming this winding leg 13, however, is of magnetic material so that the reluctance of this winding leg is slightly less than that of air and a slightly larger magnetic flux is induced as indicated by the curve C of Fig. 3. It has been found desirable to form one of the strips of the winding leg 13 of soft iron and the other strip of some material, such as brass, having substantially the same permeability as that of air. It has been found that the provision of the small magnetic strip forming part of the winding leg 13 will cause the curves A and C to be almost exactly parallel for all values of flux corresponding to a considerable range of magnetomotive force above that which produces saturation in the winding leg 12. It has heretofore been assumed that in transformers of this type the reluctance of magnetic material is substantially that of air for any value of magnetomotive force above that capable of producing saturation. This is approximately so but it has been found in connection with the present invention that changes in magnetic flux in the two winding legs 12 and 13 are more nearly exactly equal for a given change in magnetomotive force if the reluctance of the winding leg 13 is slightly decreased by providing a strip of magnetic material of very small cross section, as has already been described.

The resultant voltage of the two secondary windings 15 and 16 is equal to the difference between their two voltages. The voltage induced in the secondary winding 15 is equal to $4FN\phi^{max1}10^{-8}$, where $F$ and $\phi^{max1}$ represent respectively the frequency and maximum value of the magnetic flux in the winding 12 and N represents the number of turns in the winding 15. The voltage induced in the secodary winding 16 is equal to $4FN\phi^{max2}10^{-8}$, where $F$ and $\phi^{max2}$ represent respectively the frequency and maximum value of the magnetic flux in the winding leg 14 and N represents the number of turns in the secondary winding 16. The value of $F$ is the same for both windings and the value of N has been assumed to be the same for both windings and therefore the resultant voltage of the windings 15 and 16 is equal to $4FN10^{-8}(\phi^{max1}-\phi^{max2})$. It will be seen from Fig. 3 that for all values of magnetic flux above that corresponding to saturation of the winding leg 12, the difference between the values of the magnetic fluxes in the two winding legs is constant and may be represented by the curve L. The resultant voltage of the two windings 15 and 16 is therefore equal to $4FNL10^{-8}$ for all values of magnetomotive force above that corresponding to saturation of the winding leg 12 and therefore corresponding to a considerable variation in the frequency and speed of the generator 20. Inasmuch as the values of N and L are both constant, it follows that the voltage of the secondary windings 15 and 16 is exactly proportional to the frequency of the voltage and to the speed of the generator 20. The secondary voltage of the transformer 10 is thus directly proportional to the frequency of its primary voltage and is independent of changes in the value of its primary voltage throughout a considerable range of values. The indicating instrument 24 may therefore be calibrated to indicate directly the frequency of the voltage of the primary circuit of the transformer 10 or of the speed of a generator for supplying current to the primary side of the transformer.

The modified form of the transformer shown in Fig. 4 is similar to that shown in Figs. 1 and 2 except that the two winding legs 12 and 13 are merged together beyond their respective windings to form a single magnetic path around which is wound the primary winding 14. In both forms of the transformer shown in Figs. 1, 2 and 4 the transformer windings are surrounded by the outside legs 17 and 18 and the yokes 26 which connect the ends of the outside legs to the ends of the winding legs. The outside legs 17 and 18 and the yokes 26 thus shield the windings from outside influences which might otherwise cause disturbances in them and inaccuracy of the indications of the instrument 24.

The invention has been explained by describing and illustrating two forms thereof and it will be apparent that changes may be made without departing from the spirit of the invention and the scope of the appended claims.

What we claim as new and desire to secure by Letters Patent of the United States, is,—

1. A transformer including two magnetic winding legs of widely different magnetic properties, one of said winding legs being formed of nickel-iron alloy and the other winding leg including a thin strip of soft iron, a secondary winding surrounding each winding leg, a primary winding surrounding both winding legs, said secondary windings being connected in series with their voltages opposed, and outer magnetic legs and yokes surrounding said windings and winding legs.

2. A transformer including two magnetic winding legs of widely different magnetic properties, a secondary winding surrounding each winding leg, a primary winding surrounding both winding legs, said second windings being connected in series with their voltages opposed, and outer magnetic legs and yokes surrounding said windings and winding legs, one of said winding legs including two strips disposed against opposite sides of said yokes, and at least one of said strips being of magnetic material of small cross section.

HAROLD T. FAUS.
ALMON J. CORSON.

CERTIFICATE OF CORRECTION.

Patent No. 2,058,302.                                                       October 20, 1936.

HAROLD T. FAUS, ET AL.

It is hereby certified that error appears in the printed specification of the above numbered patent requiring correction as follows: Page 2, second column, line 55, claim 2, for "second" read secondary; and that the said Letters Patent should be read with this correction therein that the same may conform to the record of the case in the Patent Office.

Signed and sealed this 29th day of December, A. D. 1936.

Henry Van Arsdale (Seal)                                                       Acting Commissioner of Patents.